(12) United States Patent
Tournilhac et al.

(10) Patent No.: US 7,750,113 B2
(45) Date of Patent: *Jul. 6, 2010

(54) SUPRAMOLECULAR POLYMERS

(75) Inventors: Francois-Genes Tournilhac, Paris (FR); Corinne Soulie-Ziakovic, Paris (FR); Ludwik Leibler, Paris (FR); Laurent Lachaize, La Varenne Saint-Hilaire (FR)

(73) Assignee: Arkema France, Colombes (FR)

( * ) Notice: Subject to any disclaimer, the term of this patent is extended or adjusted under 35 U.S.C. 154(b) by 44 days.

This patent is subject to a terminal disclaimer.

(21) Appl. No.: 12/051,278

(22) Filed: Mar. 19, 2008

(65) Prior Publication Data

US 2008/0167442 A1     Jul. 10, 2008

Related U.S. Application Data

(62) Division of application No. 11/598,931, filed on Nov. 14, 2006, now Pat. No. 7,348,397, which is a division of application No. 10/503,610, filed as application No. PCT/FR03/00114 on Jan. 15, 2003, now Pat. No. 7,250,487.

(30) Foreign Application Priority Data

Jan. 17, 2002  (FR)  ................... 02 00596

(51) Int. Cl.
*C08G 73/06* (2006.01)
*C08G 73/08* (2006.01)
*C08G 73/00* (2006.01)

(52) U.S. Cl. ............ 528/422; 528/423; 528/425; 525/178; 525/419

(58) Field of Classification Search ............ 528/422, 528/423, 425; 525/178, 419
See application file for complete search history.

(56) References Cited

U.S. PATENT DOCUMENTS

| | | | |
|---|---|---|---|
| 4,544,609 A | 10/1985 | Hui | |
| 4,812,499 A | 3/1989 | Cipriani et al. | |
| 5,039,756 A | 8/1991 | Yamamoto et al. | |
| 5,098,949 A | 3/1992 | Sakamoto et al. | |
| 5,334,888 A | 8/1994 | Bodas | |
| 5,422,042 A | 6/1995 | Waddill et al. | |
| 6,087,448 A | 7/2000 | Mitchell et al. | |
| 6,307,058 B1 | 10/2001 | Singh et al. | |
| 6,320,018 B1 | 11/2001 | Sijbesma et al. | |

OTHER PUBLICATIONS

Singh et al; Urea/ureido functional monomoers and their use in preparation of latex paints; 1998, Cytec Technology Corp., Chem Abstract 128: 89225.

Cipriani et al; Self extinguishing thermoplastic polymer compositions, 1987, Enichem Sintesi S.p.A., Italy, Chem Abstract 106: 34040.

*Primary Examiner*—Duc Truong
(74) *Attorney, Agent, or Firm*—Thomas F. Roland

(57) ABSTRACT

The invention relates to a supramolecular polymer containing units which are linked by hydrogen bonds, said units being monomers of prepolymers comprising at least one functional group selected from the functional groups (1) and (3) and a second functional group (5) wherein A denotes oxygen, sulphur or NH and X is any unit; the hydrogen bonds

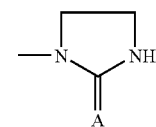 (1)

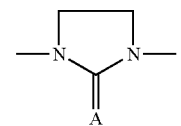

(2)

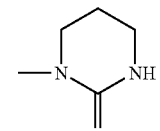

(3)

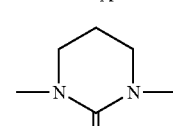

(4)

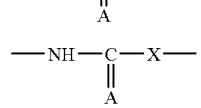

(5)

in the supramolecular polymer being formed between two identical or different functional groups chosen from the functional groups (1) to (5). The inventive polymers can be used alone, i.e. in the form of a composition which is essentially made from said polymers and, optionally, stabilizers, antioxidants, etc. or in the form of a mixture with other polymers or other products.

13 Claims, No Drawings

SUPRAMOLECULAR POLYMERS

This application is a Divisional application of, and claims priority to, U.S. Ser. No. 11/598,931 filed Nov. 14, 2006 now issued as U.S. Pat. No. 7,348,397, and which is a DIV of U.S. Ser. No. 10/503,610 filed Aug. 4, 2004, now U.S. Pat. No. 7,250,487, and further claims benefit, under U.S.C. §119 or §371 of French Application Number 02/00596, filed Jan. 17, 2002; and PCT/FR03/00114 filed Jan. 15, 2003.

FIELD OF THE INVENTION

The present invention relates to supramolecular polymers. Supramolecular polymers are polymers in which the units are monomers or prepolymers of low mass which are connected to one another via hydrogen bonds (H bridges or H bonds), whereas, in a conventional polymer, the units are connected to one another via covalent bonds. An advantage of these supramolecular polymers is that these hydrogen bonds are reversible. For example, in coating technology, it is necessary to have a polymer which has a low viscosity under high-speed shear when it is being applied and which becomes viscous again after it has been applied. Preferably, the prepolymer units in the present invention comprise imidazolidone groups, which form hydrogen bonds according to the following scheme:

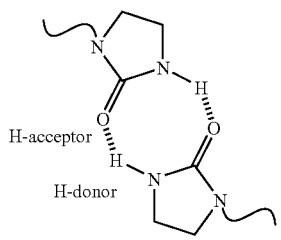

These prepolymer units can be prepared very easily by reaction of urea with polyalkyleneimines, polyamines or polyamides.

BACKGROUND OF THE INVENTION

U.S. Pat. No. 6,320,018 discloses supramolecular polymers based on units having ureidopyrimidone groups. Patent Application EP 1 031 589 discloses supramolecular polymers based on units comprising isocyanate functional groups or their derivatives. Patent Application EP 1 136 506 discloses supramolecular polymers based on units comprising glutarimide functional groups. Patent Application WO 01/07396 discloses supramolecular polymers based on units having hydroxyl functional groups and carboxylic acid functional groups carried by aromatic nuclei.

The discovery has now been made of supramolecular polymers in which the units are monomers or prepolymers which can be manufactured in a very simple way much simpler than in the prior art. It is sufficient, for example, to react urea with a product having $NH_2$ or NH functional groups separated by 2 or 3 carbon atoms. Furthermore, some of these monomers or prepolymers are novel products in themselves.

SUMMARY OF THE INVENTION

The present invention relates to a supramolecular polymer comprising units connected via hydrogen bonds, these units being monomers or prepolymers comprising at least one functional group chosen from the functional groups (1) and (3) and a second functional group chosen from the following functional groups (1) to (5):

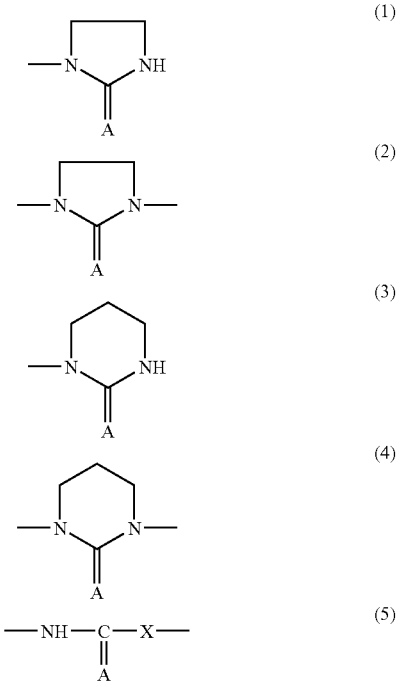

in which A denotes oxygen, sulphur or NH and X denotes any unit; the hydrogen bonds in the supramolecular polymer being formed between two identical or different functional groups chosen from the functional groups (1) to (5). The carbon atoms in the formulae (1) to (4) can be substituted.

The monomers or prepolymers comprising at least one of the functional groups (1) to (4) can be obtained by reaction of a product of following formula (6):

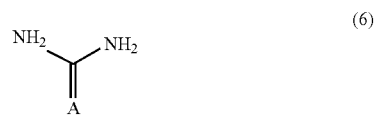

with any monomer chain or prepolymer chain comprising $—NH_2$ and —NH— or —NH— and —NH— functional groups separated by 2 or 3 carbon atoms, it being possible for these carbon atoms to carry substituents other than hydrogens.

The functional group (1) is obtained by reaction of the product (6) with a monomer or a prepolymer comprising the following linkages (1'):

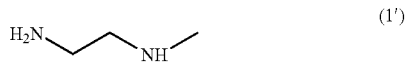

The functional group (2) is obtained by reaction of the product (6) with a monomer or a prepolymer comprising the following linkages (2'):

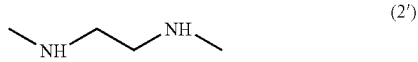

(2')

The functional group (3) is obtained by reaction of the product (6) with a monomer or a prepolymer comprising the following linkages (3'):

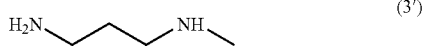

(3')

The functional group (4) is obtained by reaction of the product (6) with a monomer or a prepolymer comprising the following linkages (4'):

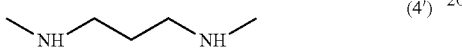

(4')

It is very clear that, in the formulae (1') to (4'), the carbon atoms which are between the nitrogens can be substituted.

The polymers of the invention can be used alone, that is to say in the form of a composition composed essentially of these polymers and optionally of stabilizers, antioxidants, and the like, or in the form of a blend with other polymers or other products.

The polymers of the invention are of particular use as:
rheology modifiers for paints or coatings,
additives for varying the fluidity of epoxy paints with temperature and in particular in powder paints,
additives in the processing of thermoplastics for carrying out reversible crosslinking,
additives for facilitating the recycling of thermoplastics by destroying the hydrogen bonds with a specific solvent,
additives in coatings for subsequently facilitating their stripping by a solvent specific for hydrogen bonds,
additives for the impact modification of polyamides,
additives in hot melts,
hot melts
additives in lubricants.

The present invention also relates to the abovementioned uses and to the compositions comprising the supramolecular polymers of the invention.

DETAILED DESCRIPTION OF THE INVENTION

As regards the monomers or prepolymers comprising at least one functional group chosen from the functional groups (1) and (3) and a second functional group chosen from the functional groups (1) to (5), advantageously "A" denotes an oxygen atom.

The monomers or prepolymers comprising one or more of the functional groups (1) to (4) can be obtained by reaction of a product of formula (6) with monomers or prepolymers carrying the corresponding precursors (1') to (4'), as explained above.

These monomers or prepolymers comprising at least one of the functional groups (1) to (4) can also be manufactured by attaching these functional groups to a product in order to convert it to a monomer or prepolymer carrying these functional groups (1) to (4).

For example, a polyamine is reacted with urea, that is to say the product of formula (6) in which A is an oxygen atom, and then this polyamine, carrying functional groups (1) and an —NH— functional group, reacts with an alkyl halide to form a monomer or a prepolymer carrying the functional groups (1). This is illustrated by the following scheme with a specific polyamine:

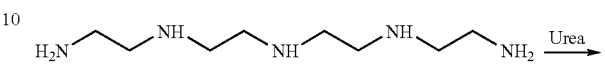

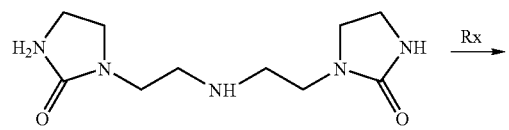

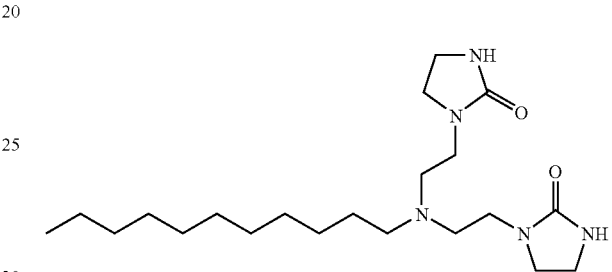

According to another example, urea is reacted with diethylenetriamine; the following product is obtained:

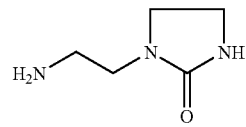

which product is subsequently reacted with a monomer or a prepolymer carrying at least one carboxylic acid functional group to produce a monomer carrying the functional groups (1) and (5).

Depending on the uses of the polymers of the invention, the monomers and the prepolymers constituting it may comprise other monomers or prepolymers which bring about a molecular disorder which prevents crystallization.

As regards the product of formula (6), it is possible to use a mixture of several products (corresponding to the various meanings of "A"), that is to say a mixture of urea, thiourea and guanidine. Advantageously, urea is used.

As regards the monomers or prepolymers comprising —NH$_2$ and —NH— or —NH— and —NH— functional groups separated by 2 or 3 carbon atoms, mention may be made of polyamines, such as diethylenetriamine (DETA), triethylenetetramine (TETA) and tetraethylenepentamine (TEPA). Examples of monomers or prepolymers carrying functional groups (1) and (2) in which A is an oxygen atom are illustrated below.

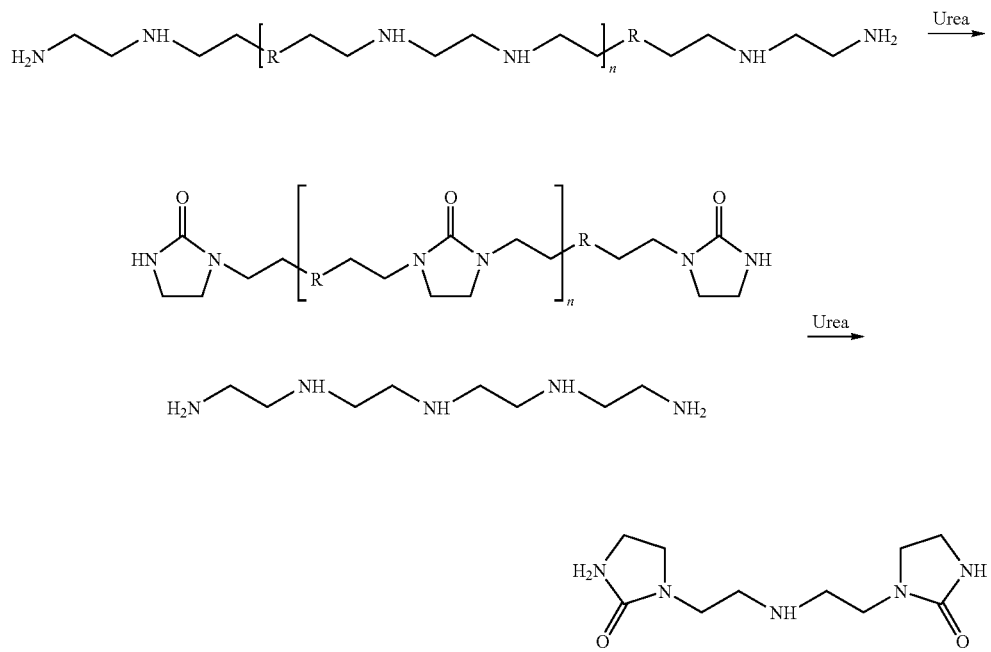

Mention may also be made of the diamines derived from acid dimers; the formation of the functional groups (1) in which A is an oxygen atom is illustrated below:

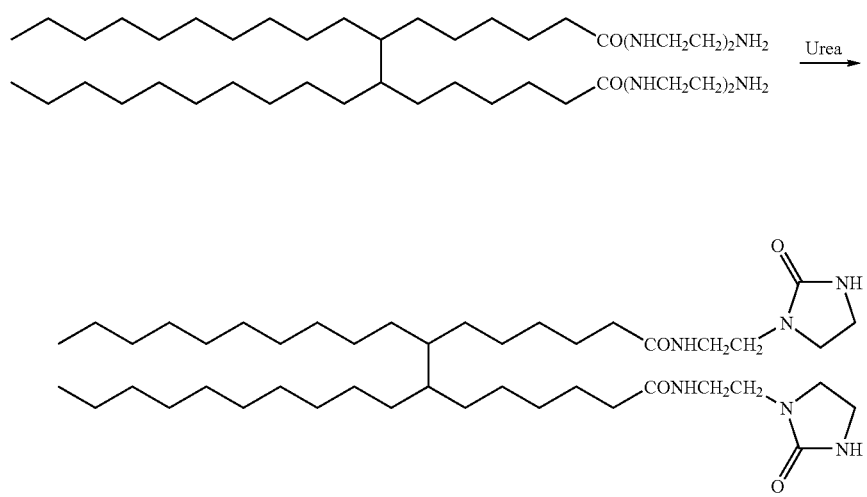

Mention may also be made of the prepolymers of polyamide type resulting from the condensation of polyamines, such as the abovementioned DETA, TETA and TEPA, with diacids. These diacids are preferably fatty acids. These diacids preferably comprise traces of acid trimers. This is illustrated by the following scheme, in which the product of formula (5) is urea.

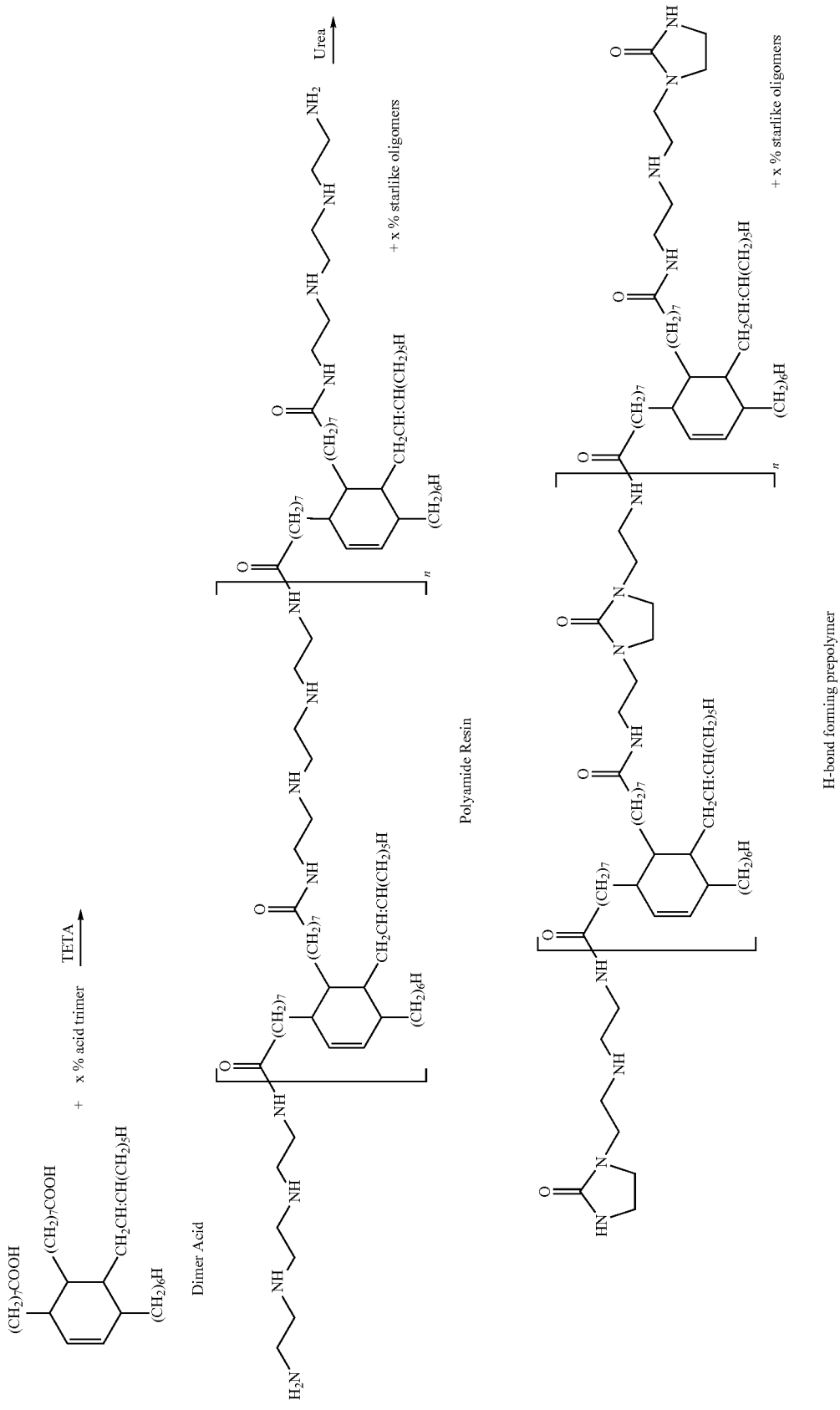

In this diagram, "x % starlike oligomers" denotes starlike oligomers produced as by-products due to the presence of the acid trimers "x % acid trimer".

EXAMPLES

Example 1

16 g (110 mmol) of triethylenetetramine (Dow Chemicals, appr. 60% purity • Note 1), 12 g (200 mmol) of urea and a small piece of carborundum are placed in a 100 ml round-bottomed flask equipped with a magnetic stirrer and a reflux condenser. The temperature is gradually brought to 120° C. The urea dissolves and gaseous evolution of ammonia takes place. The heating is progressively continued. At approximately 160° C., the viscosity greatly increases and the use of a pH indicator paper placed at the top of the reflux condenser allows the evolution of ammonia to be monitored. When the temperature approaches 190° C., the reaction mixture crystallizes. After cooling, the crystals are washed with methanol and two fractions are collected:

the solid fraction, composed essentially of ethylenebisdiimidazolidone and recrystallizable from water, M.p.=252.4° C. (lit. 240-245° C.). The ethylenebisdiimidazolidone, which comprises 2 functional groups (1), is very pure and therefore crystallizes.

the fraction which is soluble in methanol, evaporated to dryness and dissolved in water at 33% by mass. This aqueous solution is referred to as the mother solution and it comprises the monomer of the invention comprising the functional groups (1).

This fraction does not crystallize because of a molecular disorder caused by impurities in the triethylenetetramine. Analysis shows that this fraction is predominantly composed of ethylenebisdiimidazolidone (A), N-(piperazinoethyl)imidazolidone (B), BisAEP: N,N'-bis(2-aminoethyl)piperazine (C) and Branched TETA: tris(2-aminoethyl)amine (D).

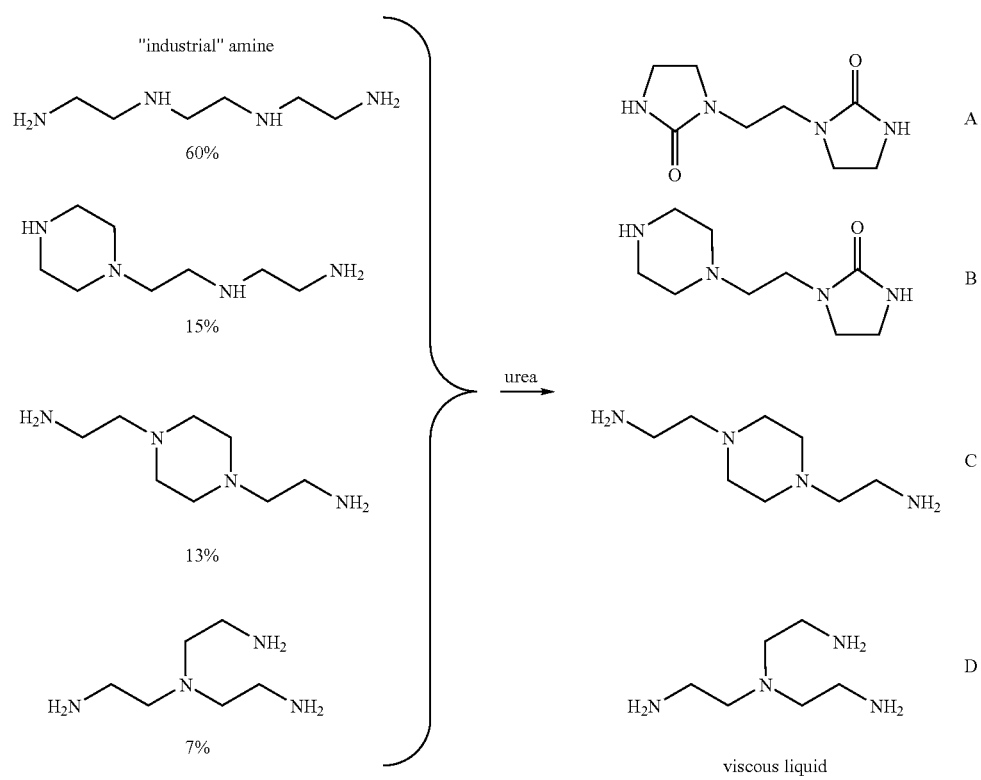

• Note 1: The grade used is a mixture of linear, cyclic and branched ethyleneamines with similar boiling points. TETA: N,N'-bis(2-aminoethyl)-1,2-ethanediamine, BisAEP: N,N'-bis(2-aminoethyl)piperazine, PEEDA: N-[(2-aminoethyl)-2-aminoethyl]piperazine, Branched TETA: tris(2-aminoethyl)amine.

Example 2

The use of the polymers of the invention as modifiers is illustrated.

The crosslinking of polyacrylic acid by the polymer of the invention is illustrated.

150 mg (mass on a dry basis) of polyacrylic acid PAA, in the form of an aqueous solution, are added to 3 g of mother solution (Example 1).

The mixture is poured into a circular PTFE mould (Ø=50 mm). After a time of three weeks in a climate-controlled chamber (T=23° C., RH=50%), the films obtained (thickness appr. 0.4 mm) can be detached from the mould and handled.

The glass transition temperatures (Tg), measured by differential scanning colorimetry (DSC), are recorded in the following table:

| Sample | 1 | 2 | 3 |
|---|---|---|---|
| PAA ref. | Coatex DV375 | Coatex DV49 | Coatex DV284 |
| PAA Mn | 1 800-2 000 | 8 000 | 500 000 |
| PAA % on a dry basis | 50% | 45% | 35% |
| Tg sample | 57° C. | 53° C. | 70° C. |

Example 3

10.5 g (41 mmol) of triethylenetetramine (Dow Chemicals, appr. 60% purity • Note 1) and 50 ml of ethanol are placed in a 500 ml round-bottomed flask equipped with a magnetic stirrer and a reflux condenser. The solution is brought to reflux (oil bath at 90° C.). 6.47 g (34 mmol) of 1,2-dibromoethane in solution in 50 ml of ethanol are added dropwise using a dropping funnel. After the addition, the reaction mixture is maintained at reflux for 3 hours.

Analysis by gas chromatography coupled to mass spectrometry shows a decrease in the proportion of TETA and an enrichment in monoaddition products: BisAEP and PEEDA, and the diaddition product bispiperazinylethylene BPE:

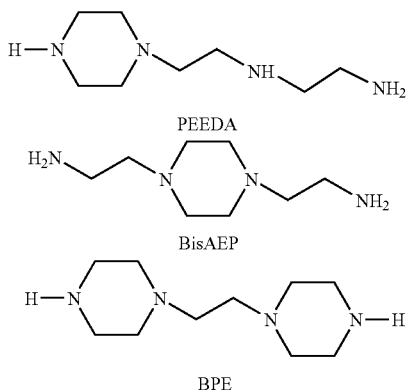

The procedure (dropwise addition of 34 mmol of dibromoethane and then reflux for 3 hours) is repeated until the TETA and PEEDA contents are approximately equal in the mixture.

After evaporating the solvent and other volatile materials under vacuum and cooling, 2.4 g (40 mmol) of urea are added. The mixture is then treated according to the directions of Example 1. At the end of the reaction, the reaction mixture does not crystallize but forms a water-soluble vitreous mass.

The mixture obtained, combined with polyacrylic acid, makes it possible to form films according to the directions of Example 2.

Example 4

20.8 g (110 mmol) of tetraethylenepentamine (Dow Chemicals, appr. 60% purity • Note 2) and 12 g (200 mmol) of urea are treated according to the directions of Example 1. At the end of the reaction, the reaction mixture does not crystallize but forms a water-soluble vitreous mass.

The mixture obtained, combined with polyacrylic acid, makes it possible to form films according to the directions of Example 2.

• Note 2: The grade used is a mixture of linear, cyclic and branched ethyleneamines with similar boiling points. TEPA: N-(2-aminoethyl)-N'-{2-[(2-aminoethyl)amino]ethyl}-1,2-ethanediamine, AETETA: 4-(2-aminoethyl)-N-(2-aminoethyl)-N'-{2-[(2-aminoethyl)amino]ethyl}-1,2-ethanediamine, APEEDA: 1-(2-aminoethyl)-4-[(2-aminoethyl)aminoethyl]piperazine, PEDETA: 1-[2-[[2-[(2-aminoethyl)amino]ethyl]aminoethyl]piperazine, Polyethylenepolyamines [CAS #029320-38-5, CAS # 068131-73-7]

Example 5

47 g of Crayamid 115 (• Note 3) and 16 g of urea are placed in a 500 ml round-bottomed flask equipped with a magnetic stirrer and a reflux condenser. The round-bottomed flask is immersed in an oil bath at 100° C. The temperature of the bath is gradually raised (appr. +20° C./hour). The use of a pH indicator paper placed at the top of the reflux condenser makes it possible to monitor the evolution of ammonia. When the temperature reaches 180° C., stirring becomes difficult. After reacting for a minimum of 2 h at 180° C., the heating is turned off. On completion of the reaction, it may happen that an excess of urea has sublimed and condensed on the walls of the round-bottomed flask.

After cooling, the possible excess of urea is removed with water by rapid rinsing of the walls of the round-bottomed flask. The reaction mixture, with a vitreous appearance, is dissolved in 300 ml of chloroform and the solution obtained is dried over magnesium sulphate and then filtered through 4 g of silica gel. The slightly cloudy solution obtained is known as the mother solution.

A portion of the mother solution is evaporated to dryness at 60° C. under vacuum for analysis:

IR: (KBr, cm$^{-1}$) 3302, 2924, 2853, 1654, 1608, 1546, 1490, 1456, 1377, 1271 Tg (DSC)=49° C.

Linear viscoelastic properties at 1 Hz (cone/plate 20 mm):

| | Temperature/° C. | | | | |
|---|---|---|---|---|---|
| | 10 | 20 | 40 | 60 | 80 |
| Storage modulus G'/Pa | 9 120 000 | 5 770 000 | 6 540 000 | 246 000 | 20 700 |
| Dissipation modulus G"/Pa | 834 000 | 829 000 | 1 180 000 | 272 000 | 41 300 |

Note 3:
Crayamid 115 is a polyamide (Mw ~2 000-4 000 g/mol), the condensation product of a TOFA-type acid dimer (TDFA being an abbreviation for Tall Oil Fatty Acid) and of triethylenetetramine.

Example 6

30 g portions of mother solution (Example 5) are poured into PTFE moulds (Ø=75 mm) placed in a not completely hermetic chamber, making possible the very slow evaporation of the solvent.

After one week, the film obtained can be detached from the mould and handled.

The residual solvent is completely removed after a few hours under vacuum or a few weeks at ambient pressure. This method produces flexible and translucent films (thickness at the centre 0.65 mm) which are slightly tacky at ambient temperature.

Example 7

50 g of Crayamid 140 (• Note 4) and 15 g of urea are treated according to the directions of Example 5. The mother solution obtained (with a solids content of 13%) is washed with 2×100 ml of aqueous saline solution, dried over magnesium sulphate and filtered through 4 g of silica gel. The films prepared from this solution according to the directions of Example 6 are transparent, flexible and nontacky. The thickness at the centre is 0.70 mm. These films can be precisely cut out with a hollow punch or using cutting tools. The objects thus obtained retain their dimensional characteristics.

• Note 4: Crayamid 140 is a polyamide (Mw ~2 000-4 000 g/mol), the condensation product of a TOFA-type acid dimer (TDFA being an abbreviation for Tall Oil Fatty Acid) and of triethylenetetramine.

Example 8

0.22 g of squalane (2,6,10,15,19,23-hexamethyltetracosane) are added to 10 g of mother solution (Example 7). The mixture is poured into a circular PTFE mould with a diameter of 50 mm. The film prepared according to the directions of Example 6 (film thickness=0.65 mm) is hard and strongly scattering, Tg=42° C.

Example 9

0.22 g of tripropylene glycol are added to 10 g of mother solution (Example 7). The mixture is poured into a circular PTFE mould with a diameter of 50 mm. The film prepared according to the directions of Example 6 (film thickness=0.65 mm) is soft and transparent, Tg=18° C.

What is claimed is:

1. Supramolecular polymer comprising units connected via hydrogen bonds, these units being monomers or prepolymers comprising at least one functional group chosen from the functional groups (1) and (3) and a second functional group chosen from the functional groups (2) to (5); or

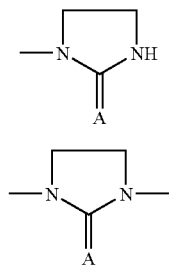

(1)

(2)

-continued

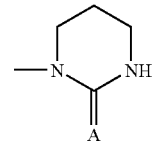

(3)

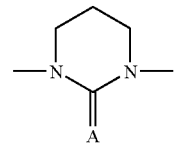

(4)

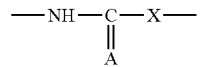

(5)

in which A denotes oxygen, sulphur or NH and X denotes any unit; the hydrogen bonds in the supramolecular polymer being formed between two identical or different functional groups chosen from the functional groups (1), (2), (3),(4) and (5).

2. Polymer according to claim 1, in which "A" denotes an oxygen atom.

3. Composition comprising a polymer according to claim 1.

4. The composition of claim 3 comprising a rheology modifier for paints or coatings.

5. The composition of claim 3 comprising an additive for varying the fluidity of epoxy paints with temperature and in particular powder paints.

6. The composition of claim 3 comprising an additive in the processing of thermoplastics for carrying out reversible crosslinking.

7. The composition of claim 3 comprising an additive for facilitating the recycling of thermoplastics by destroying the hydrogen bonds with a specific solvent.

8. The composition of claim 3 comprising an additive in coatings for subsequently facilitating their stripping by a solvent specific for hydrogen bonds.

9. The composition of claim 3 comprising an additive for the impact modification of polyamides.

10. The composition of claim 3 comprising an additive in lubricants.

11. The composition of claim 3 comprising an additive in hot melts.

12. The composition of claim 3 comprising an hot melt.

13. The composition of claim 5 comprising said additive for varying the fluidity of epoxy powder paints with temperature and in particular powder paints.

* * * * *